United States Patent [19]
Quigg et al.

[11] Patent Number: 5,003,492
[45] Date of Patent: Mar. 26, 1991

[54] DISPLAY APPARATUS HAVING DATA RESET ARRANGEMENT FOR FAST CHANGING OF DIGITAL DISPLAY

[75] Inventors: Frances M. Quigg; Mark W. Rayne, both of Cambridge, England

[73] Assignee: U.S. Philips Corporation, New York, N.Y.

[21] Appl. No.: 255,071

[22] Filed: Oct. 7, 1988

[30] Foreign Application Priority Data

Oct. 30, 1987 [GB] United Kingdom ............... 8725489

[51] Int. Cl.$^5$ .............................................. G09G 3/00
[52] U.S. Cl. ..................................... 364/518; 368/70; 368/188; 340/753
[58] Field of Search ................ 364/518, 521, 143; 340/717, 723, 752–754; 368/155, 204, 70, 186, 187, 188, 224

[56] References Cited

U.S. PATENT DOCUMENTS

| | | | |
|---|---|---|---|
| 4,284,988 | 8/1981 | Seitz et al. | 340/726 |
| 4,445,114 | 4/1984 | Stubben | 340/726 |
| 4,536,759 | 8/1985 | DiMassimo et al. | 340/717 X |
| 4,710,762 | 12/1987 | Yamada | 340/721 |
| 4,814,757 | 3/1989 | Patterson et al. | 340/752 X |

Primary Examiner—Gary V. Harkcom
Assistant Examiner—H. R. Herndon
Attorney, Agent, or Firm—Paul R. Miller

[57] ABSTRACT

The two-digit number displayed by a display apparatus (1) is adjusted by means of a microcontroller (4) in response to actuation of increment (5) and decrement (6) keys. Each new actuation of the increment key results in incrementation of the displayed number by unity. However, if this actuation is prolonged the first number in each succeeding higher ranking decade are next displayed in direct succession. Similarly, each new actuation of the decrement key results in decrementation of the displayed number of unity. However, if this actuation is prolonged the first number of the current decade and then the first number of each decade of successively lower rank are next displayed in direct succession.

9 Claims, 2 Drawing Sheets

DISPLAY APPARATUS HAVING DATA RESET ARRANGEMENT FOR FAST CHANGING OF DIGITAL DISPLAY

This invention relates to display apparatus comprising display means for a combination of first and second digits, displayed digit value control means coupled to the display means for controlling the display means to display respective members or numbers of a set of values of the combination, and a manually actuable control device for the control means, the control means being arranged to respond to each new actuation of the control device by controlling the display means to display the next member (if present) of the set, taken in a specific order, to that member which is currently being displayed, the specific order being an order in which subsets of the set having respective values of the first digit follow each other in a specific sequence.

Apparatuses of the above kind are known, for example, from United Kingdom Patent Numbers GB-B-2 020 860 and GB-B-2 051 426. In these known apparatuses, which are primarily for inclusion in timepieces, the display is a numerical one, the displayed value being incremented by unity upon each new actuation of the control device. In order to reduce the time required to set the display to a value considerably different from the current one it is arranged that prolongation of a given actuation results in the repeated incrementation of the displayed value by unity until one of a set of reference values is displayed, after which repeated incrementation continues to take place (so long as the actuation is continued) but now by values larger than unity. Thus, for example, if the "minutes" part of the display is currently "15" and it is desired to reset this to "44" the control means is newly actuated and this actuation is continued while the displayed values follow the sequence: 15, 16, 17, 18, 19, 20, 30, 40 (the relevant "reference value" being "20" in the present case). The control means is then released and newly actuated once again, this actuation being continued while the displayed values follow the sequence: 40, 41, 42, 43, 44, at which point the control means is released once again. The incrementations by values larger than unity result in a saving of time compared with that which would be entailed if only unity increments were carried out.

Another environment in which it is often required to set a display to a new value lies in the area of mobile radio communication equipment, in which the channel to which the equipment is currently tuned is indicated by a digital display, retuning being effected using the display to indicate the instantaneous tuning situation. If the equipment is installed, for example, in a road vehicle, and is operated by the driver thereof, it is obviously highly desirable that any retuning process be made as simple and rapid as possible. It is an object of the present invention to provide display apparatus in which the displayed value can be set to a new one more rapidly in many cases than is possible with the known apparatuses discussed above.

According to one aspect of the invention display apparatus of the kind defined in the first paragraph is characterised in that the control means is arranged to respond to prolongation of each actuation of the control device for respective periods of time after the display of the next member or number of the set by controlling the display means to next display, in direct succession and in an order corresponding to the specific order, the first member or number, taken in the specific order, of each subset (if present) which succeeds in the specific order that subset to which the member currently displayed belongs.

According to another aspect of the invention display apparatus of the kind defined in the first paragraph is characterised in that the control means is arranged to respond to prolongation of each actuation of the control device for respective periods of time after the display of the next member or number of the set by controlling the display means to next display, in direct succession and in an order corresponding to the specific order, (a) the last member or number, taken in the specific order, of the subset to which the member or number currently being displayed belongs if this member or number is not already being displayed and (b) the last member or number, taken in the specific order, of each subset (if present) which succeeds in the specific order that subset to which the member or number currently being displayed belongs.

It has now been recognised that although the known apparatuses exploit different modes of response by the control means to prolonged actuation of the control device as compared to repeated comparatively short actuations thereof, they do not exploit the possible differences between these modes as much as they might. In particular the unity increments to a reference value given by the known apparatuses on prolongation of the activation of the control device can be obtained in any case by repeated short actuations of the control device. Thus, although in the context of the timepiece applications of the known apparatus a single unity increment is necessary on each new actuation of the control device, a reduction in the time required to set the display to a new value can be obtained in many cases if larger increments are employed substantially immediately thereafter, if the current actuation of the control device is maintained. Considering once again the resetting of a "minutes" display from "15" to "44" as discussed in the preamble, this can be achieved more rapidly if a single prolonged actuation of the control device results in the succession of numbers 15, 16, 20, 30, 40 being displayed, after which the progression 41, 42, 43, 44 can be obtained by four subsequent short actuations. In this example the control means is arranged to respond to a new prolonged actuation of the control device by first causing the displayed value to be incremented by unity and then the first number in each succeeding decade to be displayed.

Rather than resetting a displayed numerical value to a new one by an incrementation process it is, of course, alternatively possible to achieve this, where appropriate, by a decrementation process; indeed both incrementation and decrementation facilities may be provided if desired. If the reverse of the example discussed above is considered in this respect, i.e. a resetting of the minutes display from "44" to "15", it may be arranged that a single prolonged actuation of the control device results in the succession of numbers 44, 43, 40, 30, 20 being displayed, after which the progression 19, 18, 17, 16, 15 can be obtained by five subsequent short actuations. In this example the control means is arranged to respond to a new prolonged actuation of the control device by first causing the display value to be decremented by unity, then the first number in the current decade to be displayed, and then the first number in each decade of successively lower rank to be displayed. (If the unity decrement had resulted already in the first number of the current decade being displayed then obviously the display of the first number in each decade of successively lower rank would be commenced immediately).

The display may of course include at least one further digit the displayed value of which is set by means of the control device. If this is the case, as a modification, the aforesaid first digit may be replaced by a pair of digits. Alternatively, according to another aspect, the invention provides display apparatus comprising display means for a combination of first, second and third digits, displayed digit value control means coupled to the display means for controlling the display means to display respective members of a set of values of the combination, and a manually actuable control device for the control means, the control means being arranged to respond to each new actuation of the control device by controlling the display means to display the next member (if present) of the set, taken in a specific order, to that member which is currently being displayed, the specific order being one in which first subsets of the set having respective values of the first digit follow each other in a specific sequence and further subsets (if present) of the first subsets having respective values of the second digit follow each other within the corresponding first subset in a specific sequence, characterised in that the control means is arranged to respond to prolongation of each actuation of the control device for respective periods of time after the display of the next member of the set by controlling the display means to next display, in direct succession and in an order corresponding to the specific order, (a) the first member, taken in the specific order, of each further subset (if present) which succeeds, in specific order in the first subset to which the member currently displayed belongs, that further subset to which the member currently displayed belongs, and (b) the first member, taken in the specific order, of each first subset (if present) which succeeds, in specific order, that first subset to which the member currently displayed belongs. Moreover, according to yet another aspect, the invention provides display apparatus comprising display means for a combination of first, second and third digits, displayed digit value control means coupled to the display means for controlling the display means to display respective members of a set of values of the combination, and a manually actuable control device for the control means, the control means being arranged to respond to each new actuation of the control device by controlling the display means to display the next member (if present) of the set, taken in a specific order, to that member which is currently being displayed, the specific order being an order in which first subsets of the set having respective values of the first digit follow each other in a specific sequence and further subsets (if present) of the first subsets having respective values of the second digit follow each other within the corresponding first subset in a specific sequence, characterised in that the control means is arranged to respond to prolongation of each actuation of the control device for respective periods of time after the display of the next member of the set by controlling the display means to next display, in direct succession and in an order corresponding to the specific order, (a) the last member, taken in specific order, of the further subset to which the member currently displayed belongs if this member is not already being displayed, (b) the last member, taken in specific order, of each further subset (if present) which succeeds, in specific order in the first subset to which the member currently displayed belongs, that further subset to which the member currently displayed belongs and (c) the last member, taken in the specific order, of each first subset (if present) which succeeds, in specific order, that first subset to which the member currently displayed belongs.

An embodiment of the invention will now be described, by way of example, with reference to the accompanying diagrammatic drawings in which.

Figure 1:
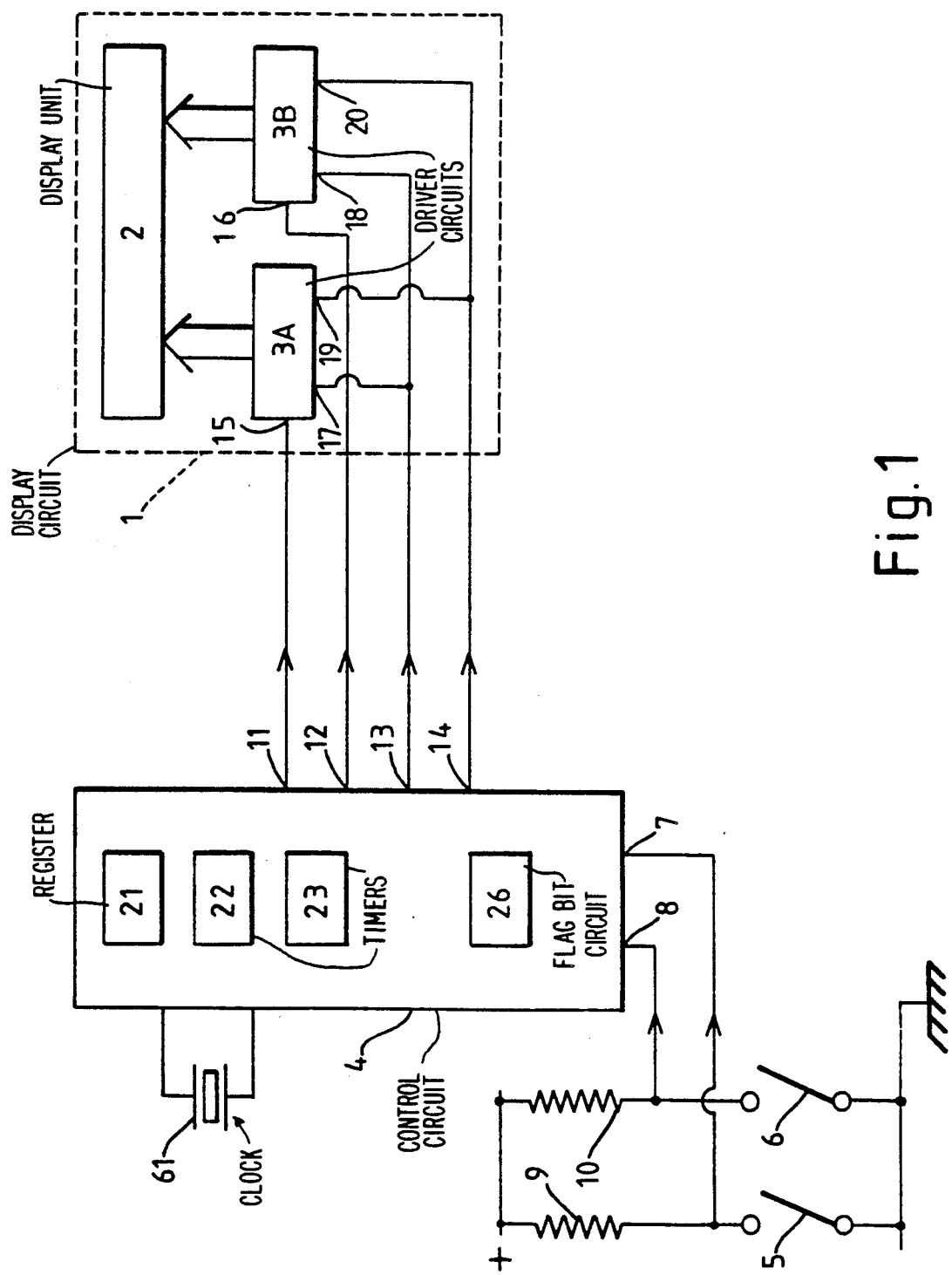
FIG. 1 is a block diagram of display apparatus.

In FIG. 1 the display apparatus comprises display means 1 in the form of a display unit 2 for displaying, inter alia, a two-digit number, and a pair of driver circuits 3A and 3B for the unit 2. If the unit 2 is of the liquid crystal type (LCD) the driver circuits 3 may, for example, each be integrated circuits of the kind available under the type number PCF2112T. The driver circuits 3, and hence the display unit 2, are controlled by control means 4 which in the present example is in the form of a suitably programmed microcontroller integrated circuit, for example of the kind available under the type number PCF80C51, provided with a clock pulse generator frequency controlling crystal 61. Two manually actuable control devices in the form of push-button switches 5 and 6 are connected to first and second (inverting) interrupt signal inputs 7 and 8 respectively of the microcontroller 4 switch 5 being connected between a resistor 9 and ground (logic "0" level) and switch 6 being connected between a resistor 10 and ground. The other ends of the resistors 9 an 10 are connected to logic "1" level (+). Switches 5 and 6 are normally open, so that the interrupt signal inputs 7 and 8 of microcontroller 4 are normally at logic "1" level. Communication between the microcontroller 4 and the display drivers 3A and 3B utilises the so-called "CBUS" principle, for which reference may be made to the PCF2112T data sheet, and microcontroller 4 generates the requisite signals on outputs 11, 12 13 and 14 thereof when data has to be transmitted to the driver circuits 3A and 3B. Outputs 11 and 12 are connected to the data line enable (DLEN) inputs 15 and 16 of the driver circuits 3A and 3B respectively, output 13 is connected to the data line (DATA) inputs 17 and 18 of the driver circuits 3A and 3B respectively, and output 14 is connected to the clock burst inputs 19 and 20 of the driver circuits 3A and 3B respectively. Output 13 may be the serial data input/output port of the microcontroller 4, and outputs 11, 12 and 14 may be respective bit lines of a parallel input/output port thereof. When the microcontroller transfers data (32 bits each time) to the driver circuit 3A or 3B it is programmed to raise its output 11 or 12 respectively to logic "1", generate the thirty-two bits, framed by framing bits, serially on its output 13, and generate a corresponding burst of clock pulses on its output 14. The thirty-two bit data word becomes stored in latches in the relevant driver circuit and thereafter governs the display accordingly until a new 32-bit word is loaded.

Microcontroller 4 includes, in addition to the usual central processing unit and program and data memories (not shown), a register 21 for storing a representation of the two-digit number a coded version of which was last transmitted to the driver circuits 3 from the output 13, i.e. for storing a representation of the two-digit number N currently being displayed by unit 2, a pair of timers 22 and 23, and a memory location for a flag bit F. It is programmed to carry out the operations indicated in the flow-chart of FIG. 2 in response to actuation (closure) of the switch 5 or 6, i.e. in response to the presentation of an interrupt signal to its input 7 or 8. The content of register 21 is set to zero in the course of the initialisation process carried out on power-up.

Figure 2:
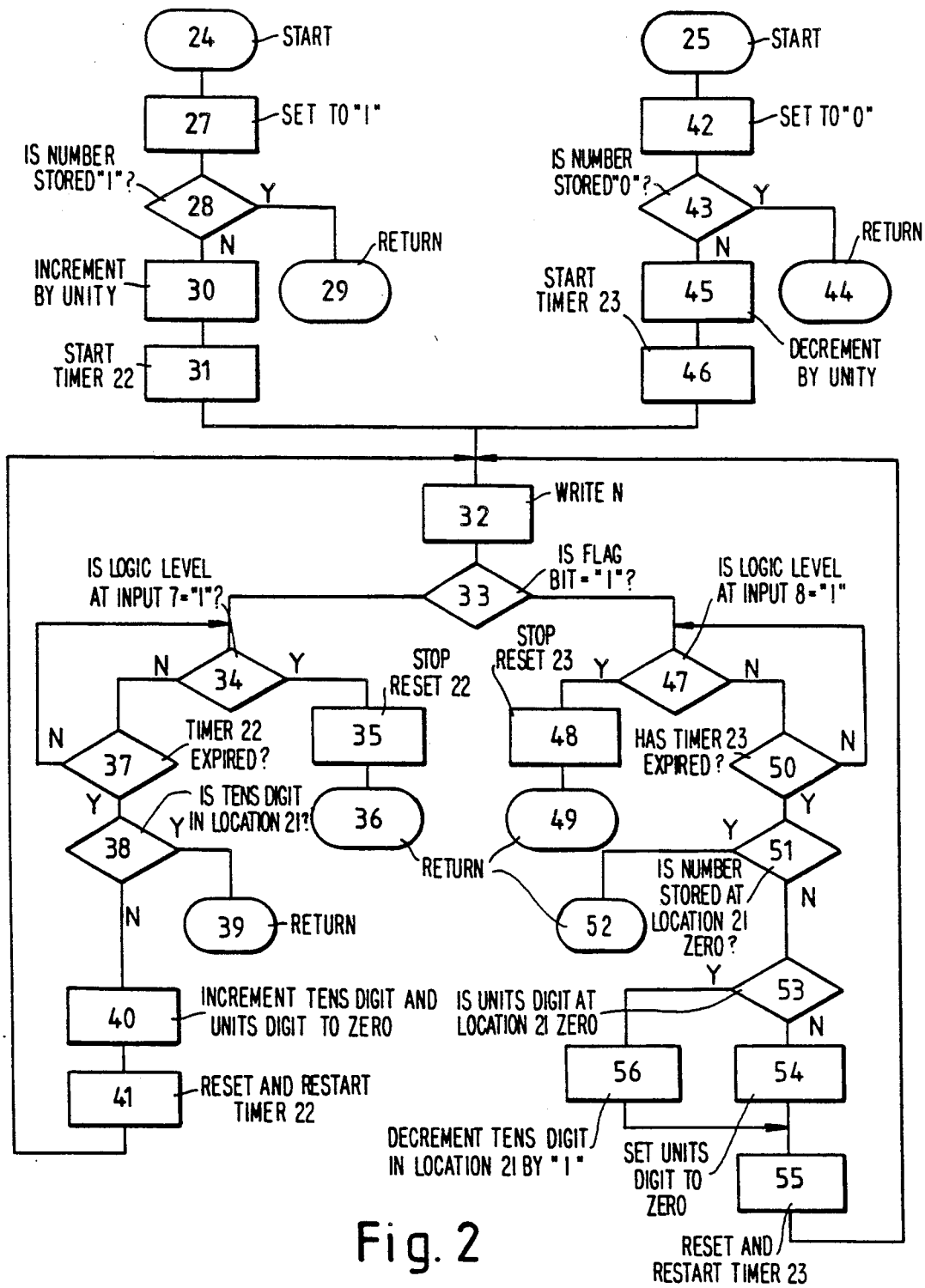
FIG. 2 is a flow chart showing operations which a microcontroller included in the apparatus of FIG. 1 is programmed to perform.

In FIG. 2 reference numerals 24 and 25 denote the starting points of the interrupt routines carried out in response to closure of the switches 7 and 8 respectively, i.e. in response to a transition from logic "1" to logic "0" at the interrupt signal inputs 7 and 8 respectively. The further blocks in FIG. 2 have the following significances.

27—Set flag bit F in location 26 to "1".
28—Is the number N stored in location 21, i.e. the number currently displayed, "99"?
29—Return.
30—Increment the number N stored in location 21 by unity.
31—Start timer 22.
32—Write the number N stored in location 21 to the display means 1.
33—Is flag bit F in location 26 "1"?
34—Is logic level at input 7 "1"?
35—Stop and reset timer 22.
36—Return.
37—Has timer 22 expired?
38—Is the tens digit of the number N stored in location 21 "9"?
39—Return.
40—Increment the tens digit of the number N stored in location 21 by unity and set the units digit of the number N to zero.
41—Reset and restart timer 22.
42—Set flag bit F in location 26 to "0".
43—Is the number N stored in location 21 "0"?
44—Return.
45—Decrement the number N stored in location 21 by unity.
46—Start timer 23.
47—Is logic level at input 8 "1"?
48—Stop and reset timer 23.
49—Return.
50—Has timer 23 expired?
51—Is the number N stored in location 21 "0"?
52—Return.
53—Is the units digit of the number N stored in location 21 zero?
54—Set the units digit of the number N to zero.
55—Reset and restart timer 23.
56—Decrement the tens digit of the number N stored in location 21 by unity.

Thus when a switch 5 or 6 is newly actuated flag F is set to "0" or "1" respectively to identify the actuated switch. If the "increment" switch 5 is actuated a test 28 is then made to determine whether incrementation of the displayed number is in fact possible. If it is (Y), incrementation is carried out and the "increment" timer 22 is started (steps 30 and 31) and the incremented number is displayed (step 32). If the switch 5 has by then been released ("Y" from test 34) the timer 22 is merely stopped and reset (step 35). Conversely, if the actuation is continuing and this is maintained until timer 22 expires (tests 34 and 35) a test is made (38) to determine if incrementation of the tens digit of the displayed number N is possible. If it is the tens digit is incremented by unity and the units digit is set to zero (if it is not already zero) in step 40 and the timer 22 is reset and restarted (step 41). The new number is then displayed, after which the operations 32-34 and 37-41 are repeated for as long as the switch 5 remains actuated or until test 38 gives a positive result. Thus each new actuation of switch 5 results in incrementation of the displayed number by unity (if possible), and provided the actuation is maintained for a subsequent period or periods of time corresponding to the time-out period of timer 22, the displayed number is changed (if possible) to the start of the next higher decade, the start of the decade which is next higher still, and so on until switch 5 is released.

Similarly, if the "decrement" switch 6 is actuated the displayed number is decremented by unity (if possible) in steps 45 and 32 and the "decrement" timer 23 is started. If the actuation of switch 6 is maintained for one or more periods corresponding to the time-out period of timer 23 (tests 47 and 50) the displayed number is then replaced (if possible) by the number at the bottom of the current decade if it is not already there (tests 51 and 53 and steps 54 and 32) and timer 23 is reset and restarted. If the displayed number is already at the bottom of a decade, however, it is replaced (if possible) by the number at the bottom of the next lower decade in steps 56 and 3, and timer 23 is reset and restarted. After this the operations 32, 33, 47 and 50-55 are repeated for as long as the switch 6 remains actuated or until test 51 gives a positive result. Thus each new actuation results in decrementation of the displayed number by unity (if possible), and provided the actuation is maintained for a subsequent period or periods of time corresponding to the time-out period of timer 23, the displayed number is changed (if possible) to the bottom of the current decade, the bottom of the next lower decade, the bottom of the decade which is next lower still, and so on until switch 6 is released.

The time-out periods of the timers 22 and 23 may be the same or different; a suitable value is one second.

Although as described the apparatus ceases to respond to new actuations of the increment switch 5 if the display is currently "99" or to prolongation of an actuation of switch 5 if the displayed number already lies in the "nineties" decade it will be appreciated that this is not necessarily the case. The programme may be easily modified so that in these circumstances the displayed number "overflows" back to zero. Similarly the programme can be modified so that a new actuation of switch 6 when the display is currently zero results in the display of "99" and a prolonged actuation of switch 6 when the display is currently zero results in the display of "90".

Although as described the set of two-digit numbers which can be displayed upon actuation of the switch 5 and/or the switch 6 comprises all numbers from zero to ninety-nine, it will be appreciated that this is not necessarily the case. For example, if the apparatus is used to display broadcast channel numbers in a mobile radio it may be that only a few specific channels are available to the user. Thus, for example, the available channels may be those numbered 00, 15, 19, 24, 27, 40, 55, 56, 57, 58 and 99. In this particular case repeated short actuations of the switch 5 and/or the switch 6 may be arranged to step the display through these numbers only, whereas prolonged actuation of the switch 5 may be arranged to step the display to the first channel number in the next higher decade containing such a channel number. Similarly, prolonged actuation of the switch 6 may be arranged to step the display to the first channel number in the current decade (if this is not already being displayed) and subsequently in succession to the first channel number in each decade of successively lower rank. In the present example, therefore, if the currently displayed number is "00", it may be arranged that a sufficiently prolonged actuation of switch 5 results in the display of the number sequence 15, 24, 40, 55, 99. Similarly, if the currently displayed number is "99" it may be arranged that a sufficiently prolonged actuation of switch 6 results in the display of the number sequence 58, 55, 40, 24, 15, 00.

As described so far, actuation of the switches 5 and 6 adjusts the display at just two digit positions. If desired it can be arranged that the display is adjustable at more than two digit positions. For example, it may be the case that the channel numbers required in the mobile radio application quoted run into the hundreds. If this is so then it may be arranged that continuation of a prolonged actuation of switch 5 which results in the displayed number being incremented in the sequence . . . 70, 80, 90 results in further incrementation in the sequence 100, 110, 120, . . . until the required decade is reached, after which the units digit can be adjusted to the desired value by further short actuations. Alternatively, it may be arranged that, once a new "century" has been reached, for example 100, prolongation of the current actuation of switch 5 (but not of subsequent actuations unless another new century is reached via that actuation) results in the displayed sequence 200, 300, 400, . . . Analogous displayed sequences may similarly be arranged to occur in response to prolonged actuation of switch 6. For example, if the displayed number is currently 426, a prolonged actuation of switch 6 may be arranged to result in the display of the sequence 425, 420, 410, 400, 390, 380, . . . or in the display of the sequence 420, 410, 400, 300, 200, . . . Which alternative of each pair of alternatives is preferable in a given case will in general depend upon the actual range of displayed numbers to be covered in total. For comparatively small ranges, e.g. maximum value in the single hundreds, the first alternative of each pair will be preferred, whereas for comparatively large ranges, e.g. maximum value in the several hundreds, the second alternative of each pair will be preferred.)

Although the invention has been described in the context of the display of numerals, it will be evident that it is also applicable to the display of other symbols, for example alphabetic characters.

We claim:

1. Display apparatus for rapidly changing data comprising:
   (a) display means for displaying a combination of a plurality of digits of a set of values,
   (b) control means coupled to said display means for controlling a change of said combination of digits in a specific order, said specific order being an order where subsets of said set of values have respective numbers following each other in a specific sequence,
   (c) manually controlled switch means for actuating said control means to change said combination of digits, wherein each new actuation of said switch means changes said combination of digits to a single next number of said set of values in said specific order, wherein a prolongation of said actuation of said switch means then changes said combination of digits to a first number of each of a next subset of said set of values, and wherein upon reaching a first number of a predetermined subset each new actuation of said switch means changes said first number of said predetermined subset to a determined number of said predetermined subset.

2. Display apparatus according to claim 1, wherein said combination of a plurality of digits include a first and a second digit.

3. Display apparatus according to claim 2, wherein said first digit is replaced by a pair of digits.

4. Display apparatus for rapidly changing data comprising:
   (a) display means for displaying a combination of a plurality of digits of a set of values,
   (b) control means coupled to said display means for controlling a change of said combination of digits in a specific order, said specific order being an order where subsets of said set of values have respective numbers following each other in a specific sequence,
   (c) manually controlled switch means for actuating said control means to change said combination of digits, wherein each new actuation of said switch means changes said combination of digits to a single previous number of a subset of said set of values in said specific order, wherein a prolongation of said actuation of said switch means then changes said combination of digits from said single previous number to a first number of the subset of said single previous number and then to each of a first number of a preceding subset of said set of values, and wherein upon reaching a first number of a predetermined subset each new actuation of said switch means changes said first number of said predetermined subset to a determined number of said predetermined subset.

5. Display apparatus according to claim 4, wherein said combination of a plurality of digits include a first and a second digit.

6. Display apparatus according to claim 3, wherein said first digit is replaced by a pair of digits.

7. Display apparatus for rapidly changing data comprising:
   (a) display means for displaying a combination of first, second and third digits of a set of values,
   (b) control means coupled to said display means for controlling a change of said combination of said first, second and third digits in a specific order, said specific order being an order where first subsets of said set of values have respective values of said first digit following each other within a corresponding first subset in a specific sequence, and where second subsets including said first subsets have respective values of said second digit following each other in another specific sequence, and
   (c) manually controlled switch means for actuating said control means to change said combination of said first, second and third digits, wherein prolongation of actuation of said switch means for respective periods of time changes said combination of first, second and third digits, wherein said control means changes a first number of each said second subset in direct succession, and wherein said control means changes a first number of each first subset succeeding that first subset to which a number currently displayed belongs.

8. Display apparatus according to claim 7, wherein said specific order includes an order where third subsets have respective values of said third digit following each other in a specific sequence, said third subsets including said first and second subsets, and wherein said control means first changes a first number of said third subset in direct succession.

9. Display apparatus for rapidly changing data comprising:
(a) display means for displaying a combination of first, second and third digits of a set of values,
(b) control means coupled to said display means for controlling a change of said combination of said first, second and third digits in a specific order, said specific order being an order where first subsets of said set of values have respective values of said first digit following each other within a corresponding first subset in a specific sequence and where second subsets including said first subsets have respective values of said second digit following each other in another specific sequence, and
(c) manually controlled switch means for actuating said control means to change combinations of said first, second and third digits, wherein prolongation of actuation of said switch means for respective periods of time changes said combination of first, second and third digits, wherein said control means changes (i) a last number of a second subset to which said last number belongs if said last number is not already displayed (ii) a last number of each second subset succeeding said second subset in (i), and (iii) and a last number of each first subset succeeding the first subset to which a currently displayed number belongs.

* * * * *